United States Patent [19]
Rudolph

[11] Patent Number: 4,835,897
[45] Date of Patent: Jun. 6, 1989

[54] FISHING LURE

[76] Inventor: John H. Rudolph, 1685 Arroyo Dr., Laguna Beach, Calif. 92651

[21] Appl. No.: 296,934

[22] Filed: Jan. 17, 1989

[51] Int. Cl.⁴ ............................................. A01K 85/00
[52] U.S. Cl. ................................................. 43/42.06
[58] Field of Search ............... 43/42.06, 42.22, 42.23, 43/43.1, 43.13, 42.12, 42.09, 42.31, 42.36

[56] References Cited

U.S. PATENT DOCUMENTS

| | | | |
|---|---|---|---|
| 2,229,239 | 1/1941 | Davis | 43/42.06 |
| 2,569,465 | 10/1951 | Farr | 43/42.06 |
| 2,659,995 | 11/1953 | Hagstrom | 43/42.06 |
| 2,797,518 | 7/1957 | Anderson | 43/42.06 |
| 2,817,180 | 12/1957 | Thomas | 43/42.06 |
| 3,041,772 | 7/1962 | Laszlo | 43/42.06 |
| 3,535,814 | 10/1970 | O'Brien | 43/42.06 |

Primary Examiner—M. Jordan
Attorney, Agent, or Firm—Edgar W. Averill, Jr.

[57] ABSTRACT

A fishing lure having a generally tubular body portion including a longitudinally aligned partition and an extending fin. The lure has an outwardly directed flare at the front and the back and exhibits a unique oscillating motion when pulled through the water.

17 Claims, 1 Drawing Sheet

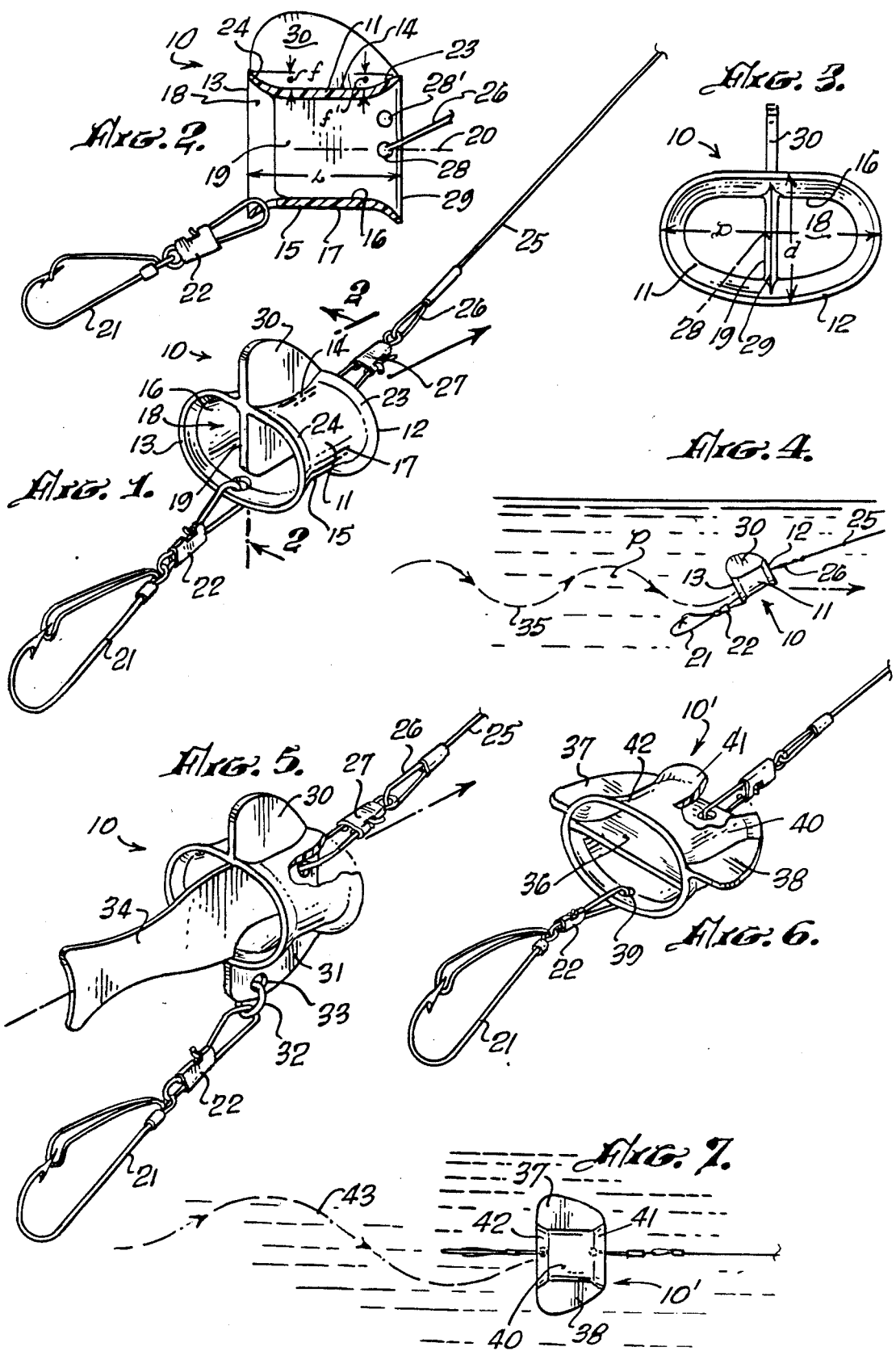

FISHING LURE

BACKGROUND OF THE DISCLOSURE

The field of the invention is sporting goods, and the invention relates more particularly to fishing lures.

Fishing lures inevitably exhibit a side to side motion when retrieved through the water. Since fishing lures are generally effective because they simulate live bait for the fish, and since many naturally occurring baits swim with an up and down rather than a side to side motion, it is beneficial to provide a lure which exhibits an up and down motion when retrieved through the water.

SUMMARY OF THE INVENTION

The present invention is for a lure which can exhibit an up and down motion when retrieved through the water.

The present invention is for a fishing lure comprising a generally tubular body portion having a front edge and a back edge, a top, a bottom, a maximum outside diameter, an outer surface, an inner passageway having an inner surface and a longitudinal axis which is located within the inner passageway. A generally planar, longitudinal partition is positioned within the inner passageway. The longitudinal partition is parallel to the longitudinal axis and is held to the inner surface of the inner pasageway. Hook means are affixed to the body near the back edge near the bottom thereof. An outwardly directed flare surrounds the front edge of the tubular body at the outer surface thereof. Similarly, an outwardly directed flare surrounds the back edge of the tubular body at the outer surface thereof causing the lure to exhibit an oscillating motion as it is retrieved through the water. Preferably, a fin is positioned on the outer surface of the body to prevent the lure from turning during retrieval. Preferably, the lure is oblong in shape, and the partition coincides with the minor diameter of the oblong tubular body portion.

BRIEF DESCRIPTION OF THE DRAWINGS

FIG. 1 is a perspective view of the lure of the present invention attached to a leader.

FIG. 2 is a cross-sectional view taken along line 2—2 of FIG. 1.

FIG. 3 is a rear view thereof.

FIG. 4 is a side view of the lure of FIG. 1 being retrieved through the water.

FIG. 5 is a perspective view of an alternate embodiment of the lure of FIG. 1.

FIG. 6 is a perspective view partially cut away of an alternate embodiment of the lure of FIG. 1.

FIG. 7 is a top plan view of the lure of FIG. 6 as it is retrieved through the water.

DESCRIPTION OF THE PREFERRED EMBODIMENTS

The lure of the present invention is shown in perspective view in FIG. 1 and indicated generally by reference character 10. Lure 10 has a generally tubular body portion 11 which has a front edge 12, a back edge 13, a top 14 and a bottom 15. The body shown in the drawings is generally oblong and has a maximum outside diameter indicated by reference character "D" in FIG. 3. The minor outside diameter is indicated by reference character "d" in FIG. 3. The tubular body portion 11 has an inner surface 16 and an outer surface 17. When the lure is retrieved through the water, water passes through an inner passageway 18 which is divided by a generally planar, longitudinal partition 19 into two halves. The longitudinal axis of the body portion 11 is indicated by reference character 20, and partition 19 is parallel to longitudinal axis 20 and may lie along longitudinal axis 20, as shown in the drawings, although it need not necessarily do so. A hook 21 is affixed to the body 11 by a snap 22 at the bottom and back edge of body portion 11. The hook helps to position and stabilize the lure.

The feature of the lure which provides its oscillating movement is a pair of outwardly directed flares, namely, a forward outwardly directed flare 23 and a rearward outwardly directed flare 24. The amount of the flare is indicated by reference character "f" and "f'" in FIG. 2 of the drawings. A typical amount of flare is between 2% and 20% and preferably about 10% of the major outside diameter "D."

The leader 25 is affixed through a loop 26 to a snap 27 which is affixed through an opening 28 at the front edge 29 of partition 19. For smaller lures, the weight of snap 27 may affect the action of the lure, and the leader may be tied directly to the lure. The action of lure 10 varies with the position of opening 28. If located along longitudinal axis 20, as shown in FIG. 2, the lure will move in a generally even plane, as shown in FIG. 4 of the drawings, where the plane is indicated by reference character "P." If the opening is located above longitudinal axis 20 (as shown at 28'), the lure will tend to rise in the water when moved rapidly.

A longitudinally positioned fin 30 is affixed at the outer surface 17 of lure 10. Fin 30 tends to prevent any spinning of the lure on retrieval. Fin 30 is preferably aligned with partition 19 for added strength. As shown in FIG. 5, a second downwardly directed fin 31 may be utilized and the hook 21 affixed through snap 22 and ring 32 to an opening 33 in fin 31. The lure of FIG. 5 also includes a tail portion 34 which can further add to the visibility and attractiveness of the lure. Tail portion 34 could be a separate piece made from a flexible material to further add to the lifelike image of the lure during retrieval.

Upon retrieval of the lure of FIG. 2, an oscillating up and down motion, indicated by reference character 35 in FIG. 4, is observed. This up and down motion is highly unusual for a fishing lure and provides a unique and attractive movement similar to that of a frog or insect trying to swim to safety. The up and down motion is believed to be controlled by the generally planar, longitudinal partition 19 which directs the unstable motion caused by flares 23 and 24 in a vertical direction. As shown in FIG. 6, this motion can, instead, be directed in a side to side motion as shown for lure 10' which has a body 40, a horizontal, longitudinal partition 36 and a pair of outwardly directed horizontal fins 37 and 38. Body 40 has a pair of flared ends 41 and 42. Hook 21 is affixed through snap 22 to an opening 39 in the lower part of body 40. The partition 36 is a metal partition. As shown in FIG. 7, which is a top plan view, the lure oscillates in a side to side direction as indicated by dotted line 43 in FIG. 7.

The lure may be further enhanced by the addition of conventional lure enhancements such as frog legs, leeches, worms or streamers which may be added adjacent hook 21. Furthermore, a spinner may be placed in front of the lure and, in fact, two lures may be retrieved on the same line by using two lengths of leaders with a lure at each end.

While the lure has been shown as having a generally oblong shape in the drawings, it could, instead, be circular, triangular, square, rectangular or other shape. Thus, when the term, "tubular," is used, it is not restricted to round or oblong but includes other longitudinal shapes such as those described above.

The lure may be fabricated from plastic or metal or rubber or any combination of these materials. Plastics can be injection molded such as PVC, ABS, high-impact polystyrene, rubber as, for instance, that sold under the trademark, "Kraton," as well as metal such as brass, copper, aluminum and galvanized steel. In the event a soft, flexible material is used, a grommet may be necessary. Alternatively, a steel leader may be molded in the lure with an eye at each end. The leader could be tied or snapped to one end and the hook on the other. Furthermore, resins such as epoxies, polyesters and polyurethanes can be molded to form the lure of the present invention. During fishing, the lure can be cast or trolled, and its action through the water depends upon the relative length and diameter as well as the speed of retrieval. The ratio of the length "L" to the maximum outside diameter "D" is preferably between about one-half to two, and ideally between three-fourths and one to provide a substantial amount of movement. When oblong, the ratio of the minor diameter to the major diameter should be around three to four. By the use of these dimensions, a lure with surprising action results.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A fishing lure comprising:
   a generally tubular body portion having a front edge and a back edge, a top, a bottom, a maximum outside diameter, an outer surface, an inner passageway having an inner surface, a longitudinal axis within said inner passageway;
   a generally planar, longitudinal partition positioned within said inner passageway, said longitudinal partition being parallel to said longitudinal axis and said longitudinal partition being held to the inner surface of said inner passageway;
   hook means affixed to said lure near the back edge at the bottom thereof;
   an outwardly directed flare surrounding the front edge of said tubular body at the outer surface thereof; and
   an outwardly directed flare surrounding the back edge of said tubular body at the outer surface thereof whereby when said lure is pulled through the water the lure will exhibit an oscillating motion in the same plane as that of the longitudinal partition.

2. The fishing lure of claim 1 further including a fin affixed to the outer surface of said lure.

3. The fishing lure of claim 2 wherein said fin is coplanar with said longitudinal partition.

4. The fishing lure of claim 1 wherein the ratio of length to the maximum outside diameter is from about 0.5 to 2.

5. The fishing lure of claim 4 wherein said ratio is between 0.75 and 1.

6. The fishing lure of claim 1 wherein the generally tubular body portion is oblong having a major outside diameter and a minor outside diameter.

7. The fishing lure of claim 6 wherein the ratio of the minor outside diameter to the major outside diameter is about three to four.

8. The fishing lure of claim 7 wherein said partition is aligned with said minor outside diameter and the hook is attached near the bottom of the partition.

9. The fishing lure of claim 1 wherein the partition is affixed horizontally across the major outside diameter and the body has a pair of fins extending outwardly in line with the partition.

10. The fishing lure of claim 1 wherein the partition is fabricated from metal.

11. A fishing lure comprising:
    an oblong tubular body portion having a front edge and a back edge, a top and a bottom, an outer surface, an inner passageway having an inner surface, a longitudinal axis within said inner passageway and said oblong tubular body having a major diameter and a minor diameter;
    a generally planar, longitudinal partition positioned within said inner passageway, said longitudinal partition being parallel to said longitudinal axis, and said longitudinal partition being held to the inner surface of said inner passageway, and said partition having an opening for attachment to a leader;
    hook means affixed to said body near the back edge at the bottom thereof;
    a longitudinally positioned fin extending outwardly from said oblong tubular body;
    an outwardly directed flare surrounding the front edge of said tubular body at the outer surface thereof; and
    an outwardly directed flare surrounding the back edge of said tubular body at the outer surface thereof whereby when said lure is pulled through the water, the lure will exhibit an oscillating motion in the same plane as that of the longitudinal partition.

12. The fishing lure of claim 11 wherein the length of the body portion is between 0.5 and 2 times the major diameter.

13. The fishing lure of claim 11 wherein the amount of flare is about 5% of the major diameter.

14. The fishing lure of claim 11 further including a hook attached to said body at the rear thereof near the base of said partition.

15. The fishing lure of claim 14 wherein said fin is an upwardly directed fin.

16. The fishing lure of claim 11 further including a tail portion affixed to the partition and extending rearwardly from said lure.

17. The fishing lure of claim 11 having an upwardly directed fin and a downwardly directed fin.

* * * * *